(12) United States Patent
Fero et al.

(10) Patent No.: US 6,860,546 B1
(45) Date of Patent: Mar. 1, 2005

(54) TWO PIECE PIVOTING VISOR ARM

(75) Inventors: Mark W. Fero, Clinton Township, MI (US); John E. McConnell, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 3 days.

(21) Appl. No.: 10/605,978

(22) Filed: Nov. 11, 2003

(51) Int. Cl.[7] .............................. B60N 3/00; B60J 3/00
(52) U.S. Cl. ............................ 296/187.05; 296/97.12; 296/97.13
(58) Field of Search ................ 296/97.9, 97.12, 296/97.13, 97.5, 97.4, 187.05, 96.21

(56) References Cited

U.S. PATENT DOCUMENTS

| | | | | |
|---|---|---|---|---|
| 2,110,120 A | * | 3/1938 | Ball | 296/97.13 |
| 2,784,028 A | * | 3/1957 | Swider et al. | 296/97.13 |
| 2,833,592 A | * | 5/1958 | Lewis | 296/97.12 |
| 2,917,186 A | * | 12/1959 | Beets | 211/97 |
| 2,965,415 A | * | 12/1960 | Dryden | 296/97.13 |
| 3,317,225 A | * | 5/1967 | Cooper | 403/24 |
| 3,330,594 A | * | 7/1967 | Cadle | 296/97.9 |
| 5,150,258 A | | 9/1992 | Schmidt et al. | 359/608 |
| 5,580,117 A | * | 12/1996 | Goclowski | 296/97.6 |
| 6,139,083 A | * | 10/2000 | Fischer et al. | 296/97.11 |
| 6,173,990 B1 | * | 1/2001 | Nakajima et al. | 280/730.2 |
| 6,334,626 B2 | * | 1/2002 | Nakajima et al. | 280/730.2 |
| 6,494,521 B2 | | 12/2002 | Hennessey | 296/97.9 |
| 6,604,773 B2 | * | 8/2003 | Aoki et al. | 296/97.9 |
| 6,676,129 B2 | * | 1/2004 | Wilson | 296/97.9 |
| 2001/0005088 A1 | | 6/2001 | Hennessey | 296/97.1 |
| 2003/0015886 A1 | | 1/2003 | Hennessey | 296/97.1 |
| 2004/0090080 A1 | * | 5/2004 | Yasuhara et al. | 296/97.9 |

FOREIGN PATENT DOCUMENTS

| | | | |
|---|---|---|---|
| DE | 3717094 | * | 12/1988 |
| EP | 399368 | * | 11/1990 |
| EP | 421201 | * | 4/1991 |

* cited by examiner

Primary Examiner—D. Glenn Dayoan
Assistant Examiner—H. Gutman
(74) Attorney, Agent, or Firm—Bill C Panagos

(57) ABSTRACT

The present invention provides for a two piece pivoting sun visor rod upon which sun visors are rotationally mounted, wherein the pivoting sun visor rod comprises a two piece sun visor rod having a pivot joint incorporated therein. Further, the present invention relates to a two piece sun visor rod having both a pivot joint and a means of electrically connecting a vanity light.

20 Claims, 5 Drawing Sheets

TWO PIECE PIVOTING VISOR ARM

BACKGROUND OF INVENTION

1. Field of the Invention

The present invention generally relates to automotive sun visors which are rotatively and pivotally mounted above the windshield. More particularly, the present invention relates to pivot rods upon which sun visors are pivotally mounted, wherein the pivot rods comprise two piece pivoting sun visor rods. Further, the present invention relates to two piece pivoting sun visor rods having a vanity light electrical connection means incorporated therein.

2. Description of the Related Art

Motor vehicle standards are being continuously updated. One area of current concern is occupant safety in the event of a crash. Occupants are typically violently moved in relation to the vehicle due to the inertial forces involved in a crash. Most vulnerable is the head of the occupants. In order for vehicle manufacturers to meet new safety standards prevention of head injury by violent contact is required.

One area of the interior of the passenger compartment of a motor vehicle that is particularly dangerous in the event of a head impact is the sun visor and sun visor arm. The head can impact the sun visor or sun visor arm during a collision. Under this type of condition the sun visor or sun visor arm cannot fracture during the deployment of the side air curtain while at the same time not inhibiting the proper deployment of the side air curtain. Further, the sun visor and sun visor arm cannot lose pieces or create sharp jagged pieces that could cut. Solutions to this type of potential head injury are therefore required.

With many vehicles now incorporating side air curtains, it has become important to ensure that in the event of a side air curtain deployment the sun visor cannot detach from the vehicle and/or does not allow particles to break off the visor, and further that the sun visor does not impede the proper and timely deployment of the side air curtains.

For example, U.S. Pat. No. 5,150,258 issued Sep. 22, 1992 to Schmidt et al teaches a rear view mirror and sun visor assembly that allows for rotation of the sun visor around the mirror.

U.S. Pat. No. 6,494,521 issued Dec. 17, 2002 to Hennessey, U.S. Patent Application Publication Number 2001/0005088 published Jun. 28, 2001 to Hennessey and U.S. Patent Application Publication Number 2003/0015886 published Jan. 23, 2003 all teach cover members to cover the sun visor arm and elbow to prevent an occupant"s head from hitting same during a collision.

DISCLOSURE OF THE INVENTION

The present invention provides advantages and alternatives over the prior art by providing a two piece sun visor rod which allow the energy of an impact with the sun visor by a vehicle side curtain to rotate the sun visor downward and forward, preventing it from detaching from the vehicle.

According to a further aspect of the present invention, there is provided a two piece sun visor rod having the provision to provide electrical connection for a vanity mirror mounted in or on the sun visor and which allows the energy of an impact with the sun visor assembly by a vehicle side curtain to rotate the sun visor downward and forward, preventing it from detaching from the vehicle.

According to yet another aspect of the present invention there is provided a jointed two piece visor arm structure of a sun visor assembly disposed in a passenger compartment, the visor arm transferring energy of impact of the sun visor assembly with a deploying side air curtain comprising: a first visor arm piece having a rod-like geometry and two ends with an elbow bend located along the length thereof in a desired location, a groove around the periphery of and near one end of said first visor arm piece for connecting the visor arm structure to a sun visor assembly mounting bracket, and a pivot joint fitting having pivot pin bore therein at the opposite end of said first visor arm piece; a second arm piece having a substantially straight rod-like geometry and two ends having located at one end a pivot joint fitting having pivot pin bore engagingly complimentary to the pivot joint fitting of said first visor arm piece; a pivot pin joining said complimentary joint fittings together through said bores of said first and said second arm pieces providing a moveable connection around the pivot pin; thereby allowing the visor arm structure to bend the sun visor assembly out of the way of the deploying side air curtain.

According to a yet further aspect of the present invention there is provided a jointed two piece visor arm structure of a sun visor assembly disposed in a passenger compartment, the visor arm transferring energy of impact of the sun visor assembly with a deploying side air curtain comprising: a first visor arm piece having a rod-like geometry and two ends with an elbow bend located along the length thereof in a desired location, a groove around the periphery of and near one end of said first visor arm piece for connecting the visor arm structure to a sun visor assembly mounting bracket, and a tongue for a tongue and groove-type joint having pivot pin bore therein at the opposite end of said first visor arm piece; a second arm piece having a substantially straight rod-like geometry and two ends having located at one end a groove for a tongue and groove-type joint fitting having pivot pin bores engagingly complimentary to the tongue of said first visor arm piece; a pivot pin joining said complimentary joint fittings together through said bores of said first and said second arm pieces providing a moveable connection around the pivot pin; thereby allowing the visor arm structure to bend the sun visor assembly out of the way of the deploying side air curtain.

According to still another aspect of the present invention there is provided a jointed two piece visor arm structure of a sun visor assembly disposed in a passenger compartment, the visor arm transferring energy of impact of the sun visor assembly with a deploying side air curtain comprising: a first visor arm piece having a rod-like geometry and two ends with an elbow bend located along the length thereof in a desired location, a groove around the periphery of and near one end of said first visor arm piece for connecting the visor arm structure to a sun visor assembly mounting bracket, and a pivoting lap joint fitting having pivot pin bore therein at the opposite end of said first visor arm piece; a second arm piece having a substantially straight rod-like geometry and two ends having located at one end a complimentary pivoting lap joint fitting having pivot pin bore engagingly complimentary to the pivot joint fitting of said first visor arm piece; a pivot pin joining said complimentary pivoting lap joint fittings together through said bores of said first and said second arm pieces providing a moveable connection around the pivot pin; thereby allowing the visor arm structure to bend the sun visor assembly out of the way of the deploying side air curtain.

The present invention thus advantageously provides a sun visor rod which allows for proper deployment of a vehicle side curtain without interference by the sun visor assembly while simultaneously preventing the sun visor assembly from detaching from the vehicle.

DETAILED DESCRIPTION

Figure 1:
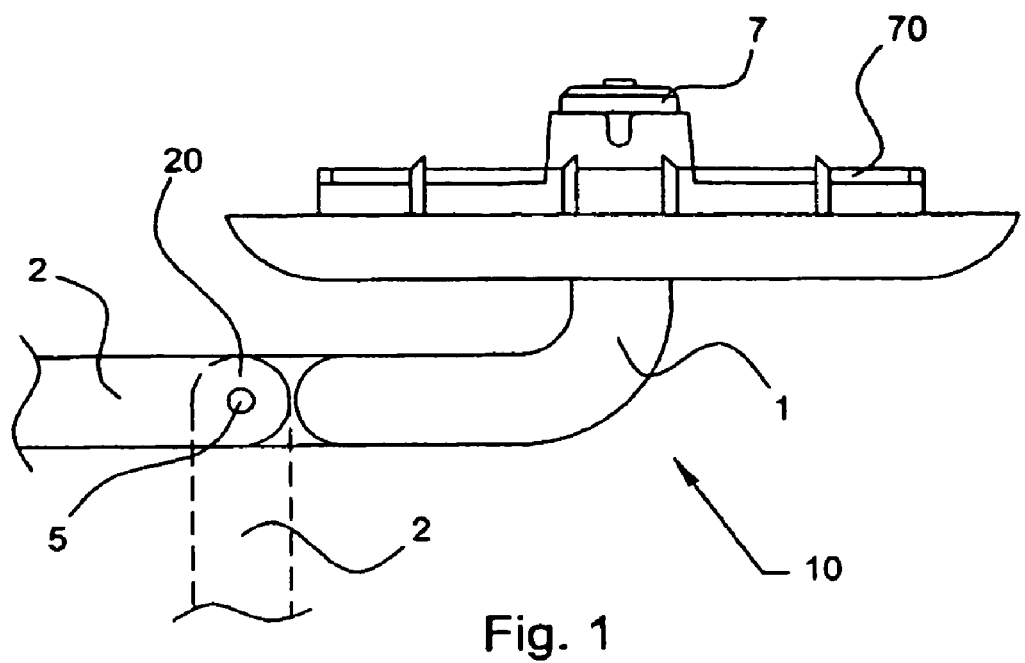
FIG. 1 shows a partial side plan view of the joint area of the two piece pivoting visor arm of the present invention.

Reference will now be made to the drawings, wherein to the extent possible like reference numerals are utilized to designate like components throughout the various views. Referring to FIG. 1, which presents a partial plan view of the mounting end portion 10 of a sun visor rod of the present invention mounted in a sun visor rod mounting bracket 70, the mounting end portion comprising an elbow bend section 1 capable of mounting in a sun visor rod mounting bracket 70, and retained in said sun visor rod mounting bracket 70 by retaining section 7, and a sun visor mounting section 2 joined to elbow bend section 1 by means of a pivoting joint 20 and pivot hinge pin 5. Further, FIG. 1 shows the sun visor mounting section 2 in both the normal use position and in the downward collapsed position.

Figure 2:
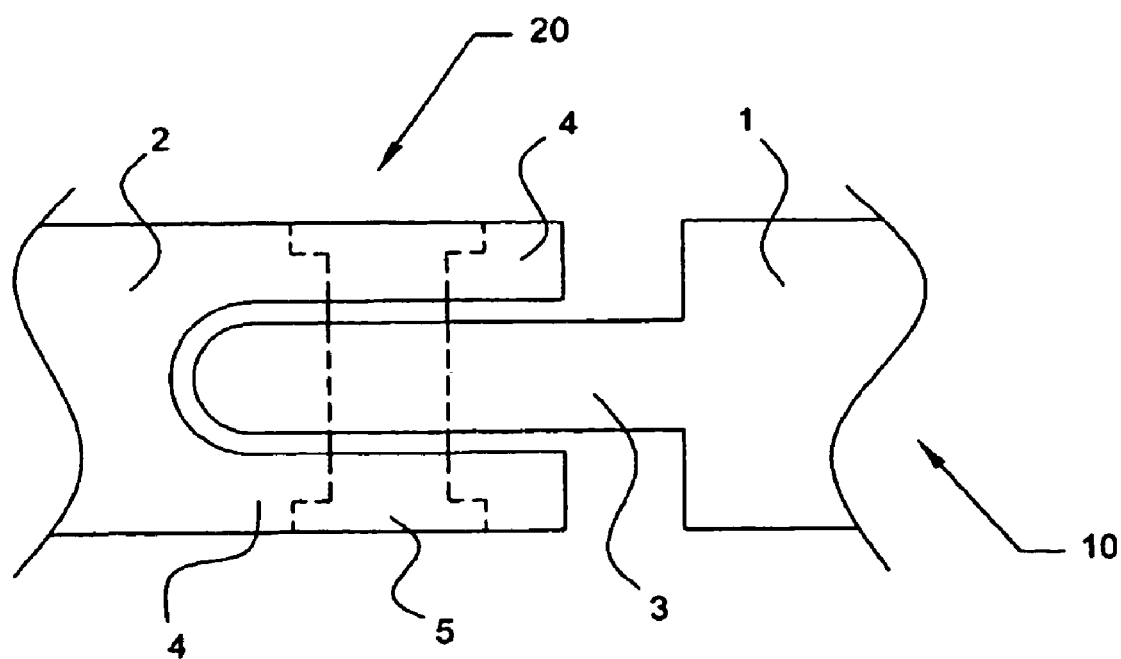
FIG. 2 shows a partial top plan view of one preferred embodiment of the joint of the two piece pivoting visor arm of the present invention.

Referring now to FIG. 2, there is shown the pivoting joint 20 of one preferred embodiment of the present invention comprising a tongue portion 3 at the pivot joint end of elbow bend section 1, and sun visor mounting section 2 having a groove portion 4 at its pivot joint end for receiving tongue portion 3 of elbow bend section 1. Tongue 3 and groove 4 having complimentary bores 6 (FIG. 6) for introduction of pivot hinge pin 5.

Figure 3:
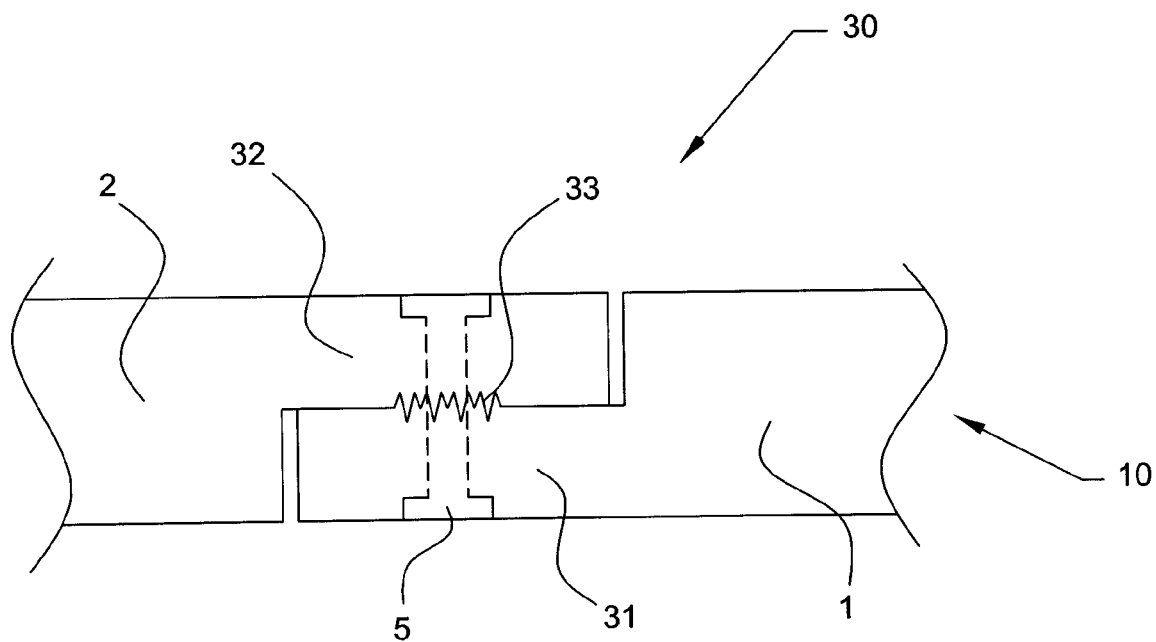
FIG. 3 shows a partial top plan view of another preferred embodiment of the joint of the two piece pivoting visor arm of the present invention with engaging integral teeth.

Turning now to FIG. 3, there is shown another preferred embodiment of the present invention showing another preferred joint 30. Joint 30 comprising elbow bend section 1 and sun visor mounting section 2 each having mating portions 31 and 32 respectively. The mating faces of mating portions 31 and 32 each having integral teeth that interact to keep the two sun visor rod sections 1 and 2 in a desired position for normal operation, but still allow it to rotate out of the way of the air curtain. Also shown is pivot hinge pin 5 mounted in complementary bores 6 (FIG. 4) in mating portions 31 and 32.

Figure 4:
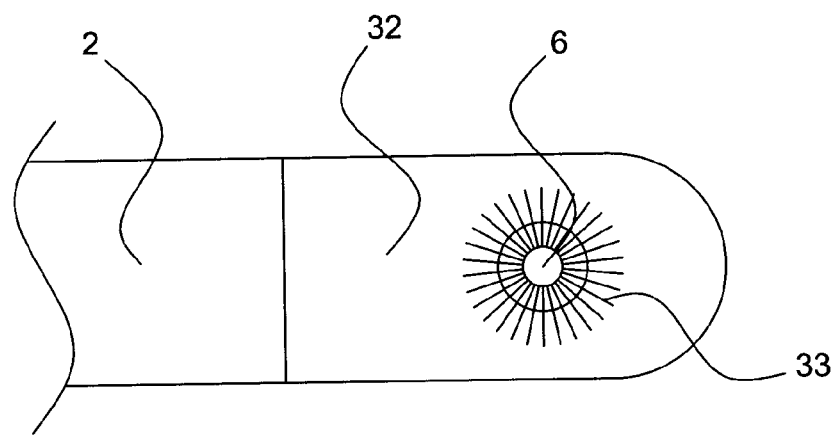
FIG. 4 show a partial side plan view of the pivot hinge area of the preferred embodiment of the invention of FIG. 3 showing integral teeth.

Referring to FIG. 4, there is shown a partial plan side view of the mating portion 32 of sun visor rod section 2 showing a detail of a preferred embodiment of integral teeth 33 as well as the bore 6 through which pivot hinge pin 5 (FIG. 3) passes.

Figure 5:
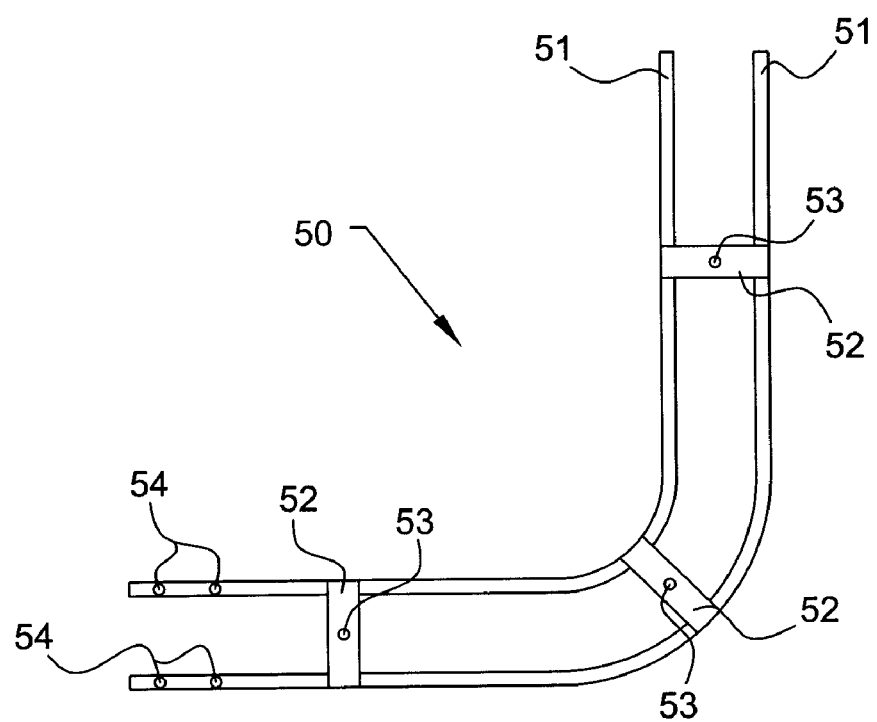
FIG. 5 shows a plan view of a preferred embodiment of an electrical connecting means for powering a vanity light.

Referring further to FIG. 5 there is shown a plan view of one embodiment of a power conducting assembly 50 for providing power to a vanity light mounted in the sun visor comprising a pair of electrically conductive members 51 positioned in spaced relationship by a plurality of spacing members 52, and further shown are rotational engagement detents 54. As is further shown spacing members 52 each have at least one locator bore 53 for positioning the power conducting assembly 50 within the mold used to produce the sun visor arm of the present invention.

Figure 6:
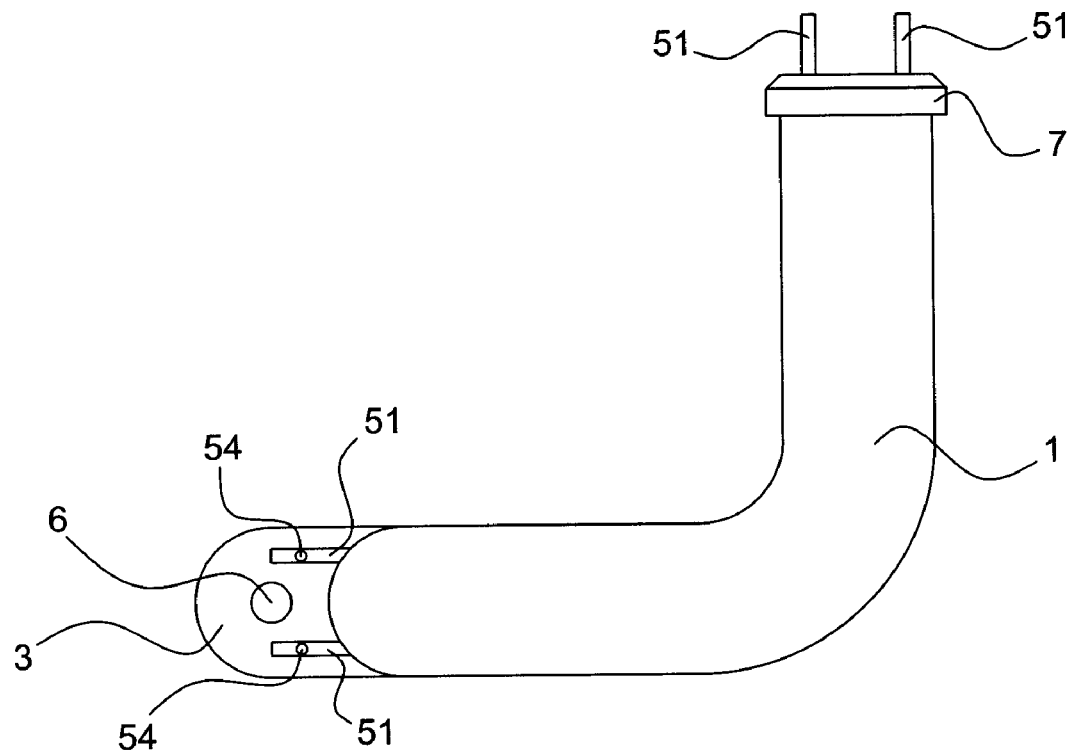
FIG. 6 shows a plan view of the electrical connecting means of FIG. 5 mounted in one preferred embodiment of the present invention.

Turning now to FIG. 6 there is shown the power conducting assembly 50 mounted within the elbow bend section 1 of the sun visor arm embodiment of the present invention as shown in FIG. 1. Shown are the electrically conductive member 51 ends protruding from the mounting bracket end of elbow bend section 1, and the electrically conductive member 51 ends having rotational engagement detents 54 exposed at the tongue portion 3. Also shown is bore 6 through which pivot hinge pin 5 (not shown) passes. Also shown is retaining section 7.

Figure 7:
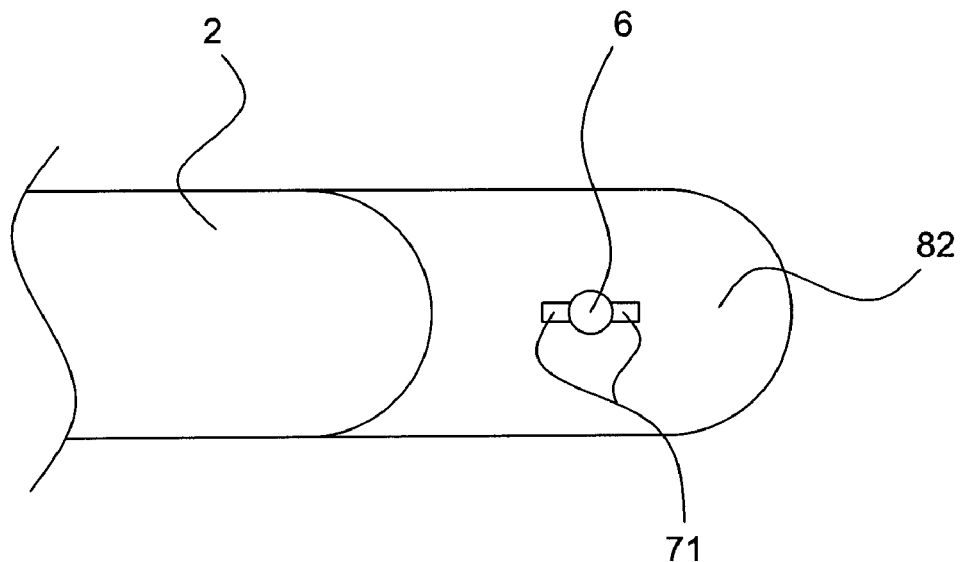
FIG. 7 shows a partial side plan view of the pivot hinge area of another preferred embodiment of the invention.

FIG. 7 shows a partial plan side view of the mating portion 82 of sun visor rod section 2 showing a detail of a preferred embodiment of the female positioning slots 71 as well as the bore 6 through which pivot hinge pin 5 (not shown) passes. The slots and lugs keep the visor in a desired position for normal operation, but still allow it to rotate out of the way of the deploying air curtain.

Figure 8:
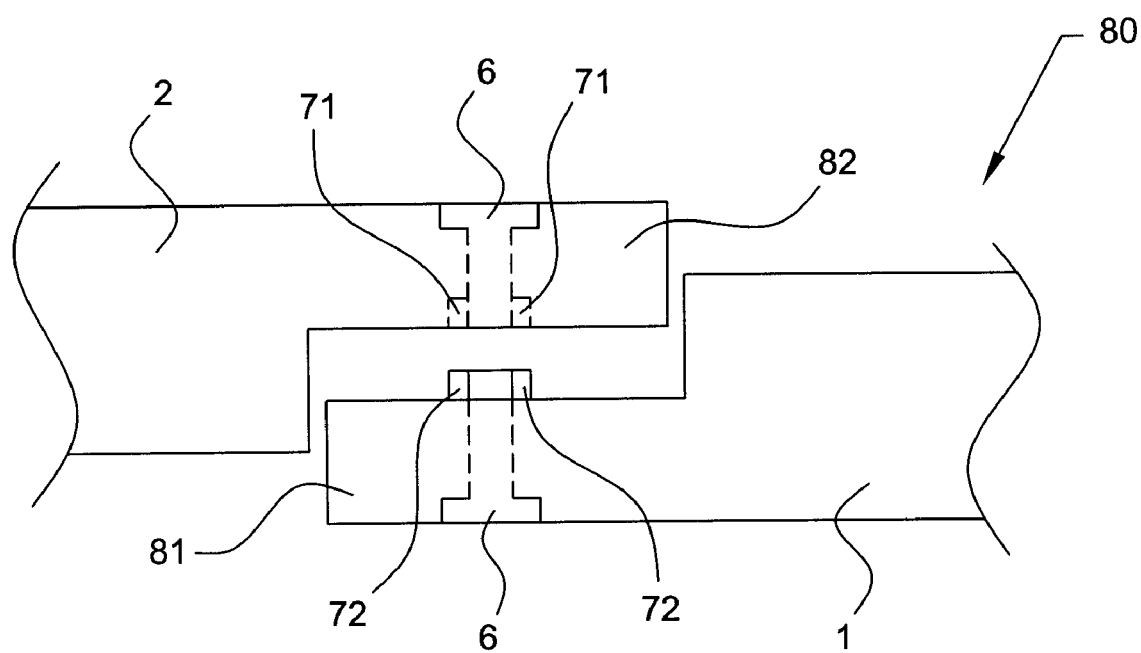
FIG. 8 shows a partial top plan view of yet another preferred embodiment of the joint of the two piece pivoting visor arm of the present invention.

Turning to FIG. 8 there is shown another preferred embodiment of the present invention showing a partial top plan view of another preferred joint 80. Joint 80 comprising elbow bend section 1 and sun visor mounting section 2 each having mating portions 81 and 82 respectively. The mating faces of mating portions 81 and 82. Mating portion 81 having male mating lugs 72 and mating portion 82 having corresponding female slots 71 that interact to keep the two sun visor rod sections 1 and 2 in a desired position. Also shown are pivot hinge pin bores 6 in mating portions 81 and 82.

Figure 9:
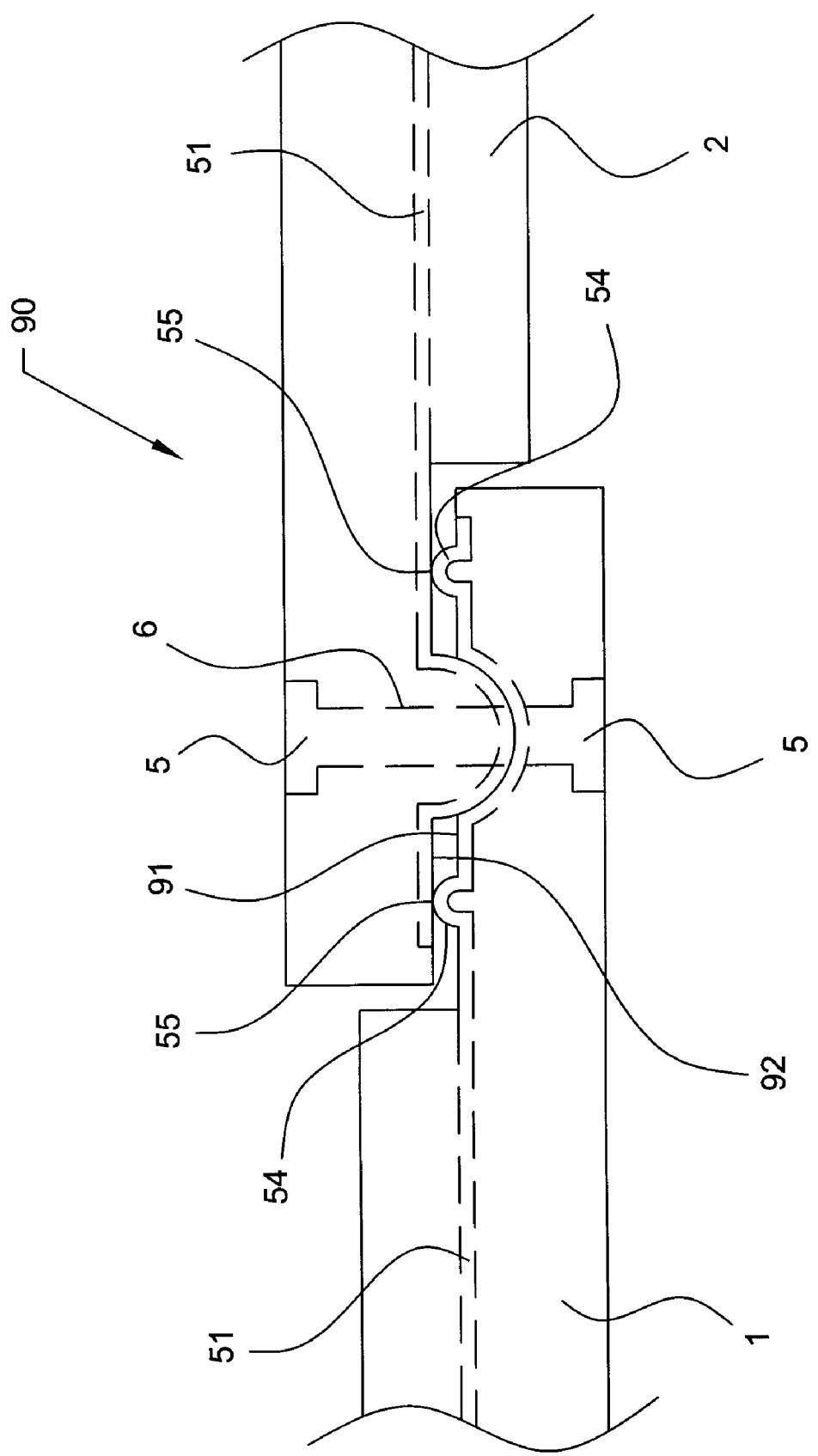
FIG. 9 show a partial top plan view of a preferred embodiment of the joint of the two piece pivoting visor arm having an electrical connecting means.

Referring to FIG. 9 there is shown a partial plan top view of yet another preferred embodiment of a joint 90 having a power conducting assembly for providing power to a vanity light mounted in the sun visor comprising in each jointed arm portion a corresponding pair of electrically conductive members 51 positioned in spaced relationship by a plurality of spacing members 52 (FIG. 5), and further shown are rotational engagement detents 54 located on the mating face 91 of elbow bend section 1 and corresponding electrical contact area 55 of electrically conductive members 51 in the mating face 92 of sun visor mounting section 2 allowing the supply of electrical current through the joint. Also shown is pivot hinge pin 5 mounted in pivot hinge pin bore 6.

In practice the pivoting two piece sun visor rod of the present invention may be made of any suitable material as is well known in the art. Suitable materials include, for example, acrylonitrile butadiene styrene (ABS), Polypropylene, acetal, polycarbonate/ABS, nylon, and nylon filled with glass fiber or other known filler. It is further understood that all the parts of the sun visor rod may be made of the same material or the various parts may be made of different materials. Presently preferred is to make all portions of the sun visor rod from 33% glass fiber reinforced nylon.

The pivot hinge pins, likewise, may be made of any material well known in the art, including but not limited to, aluminum, acetal, nylon, and steel. The presently preferred pivot hinge pin material is steel.

The power conducting assembly pair of electrically conductive members may be made of any well known conductive material, presently preferred is copper metal flatwire. Likewise, the spacing members may be made of any well known non-conductive material including, for example, acrylonitrile butadiene styrene (ABS), polypropylene, nylon, and acetal, preferably the spacing members are made of the same material as that of the sun visor rod.

Although the preferred embodiments of the present invention has been disclosed, various changes and modifications may be made without departing from the scope of the invention as set forth in the appended claims.

What is claimed is:

1. A jointed two-piece visor arm structure of a sun visor assembly disposed in a passenger compartment, the visor arm structure transferring energy of impact of the sun visor assembly comprising:
   a first visor arm piece having a rod-like geometry and two ends with an elbow bend located along the length thereof in a desired location, a retaining section around the periphery of and near one end of said first visor arm piece for connecting the visor arm structure to a sun visor assembly mounting bracket, and a pivot joint fitting having pivot pin bore therein at the opposite end of said first visor arm piece;
   a second arm piece having a substantially straight rod-like geometry and two ends having located at one end a pivot joint fitting having pivot pin bore engagingly complimentary to the pivot joint fitting of said first visor arm piece;
   a pivot pin joining said complimentary joint fittings together through said bores of said first and said second arm pieces providing a moveable connection around the pivot pin;
thereby allowing the visor arm structure to bend the sun visor assembly out of the way of the deploying side air curtain.

2. The jointed two-piece visor arm structure as claimed in claim 1 wherein, said structure comprises a material selected from the group consisting essentially of acrylonitrile butadiene styrene (ABS), nylon, glass filled nylon, polypropylene, acetal, preferably glass filled nylon, and most preferably 33% glass filled nylon.

3. The jointed two-piece visor arm structure as claimed in claim 1 wherein, said first and said second arm pieces are comprised of the same material.

4. The jointed two-piece visor arm structure as claimed in claim 1 wherein, said first and said second arm pieces are comprised of different materials.

5. The jointed two-piece visor arm structure as claimed in claim 1 wherein, said pivot pin comprises steel.

6. The jointed two-piece visor arm structure as claimed in claim 1 wherein, said mating faces of the complimentary joint fittings have located thereon mating lugs and slots.

7. The jointed two-piece visor arm structure as claimed in claim 1 wherein, the mating faces of the complimentary joint fittings have located thereon saw-tooth like surfaces.

8. A jointed two-piece visor arm structure of a sun visor assembly disposed in a passenger compartment, the visor arm structure transferring energy of impact of the sun visor assembly comprising:
   a first visor arm piece having a rod-like geometry and two ends with an elbow bend located along the length thereof in a desired location, a retaining section around the periphery of and near one end of said first visor arm piece for connecting the visor arm structure to a sun visor assembly mounting bracket, and a tongue for a tongue and groove-type joint having pivot pin bore therein at the opposite end of said first visor arm piece;
   a second arm piece having a substantially straight rod-like geometry and two ends having located at one end a groove for a tongue and groove-type joint fitting having pivot pin bores engagingly complimentary to the tongue of said first visor arm piece;
   a pivot pin joining said complimentary joint fittings together through said bores of said first and said second arm pieces providing a moveable connection around the pivot pin;
thereby allowing the visor arm structure to bend the sun visor assembly out of the way of the deploying side air curtain.

9. The jointed two-piece visor arm structure as claimed in claim 8 wherein, said structure comprises a material selected from the group consisting essentially of acrylonitrile butadiene styrene (ABS), nylon, glass filled nylon, polypropylene, acetal, preferably glass filled nylon, and most preferably 33% glass filled nylon.

10. The jointed two-piece visor arm structure as claimed in claim 8 wherein, said first and said second arm pieces are comprised of the same material.

11. The jointed two-piece visor arm structure as claimed in claim 8 wherein, said first and said second arm pieces are comprised of different materials.

12. The jointed two-piece visor arm structure as claimed in claim 8 wherein, said pivot pin comprises steel.

13. The jointed two-piece visor arm structure as claimed in claim 8 wherein, said mating faces of the complimentary joint fittings have located thereon mating lugs and slots.

14. The jointed two-piece visor arm structure as claimed in claim 8 wherein, the mating faces of the complimentary joint fittings have located thereon saw-tooth like surfaces.

15. A jointed two-piece visor arm structure of a sun visor assembly disposed in a passenger compartment, the visor arm structure transferring energy of impact of the sun visor assembly comprising:
   a first visor arm piece having a rod-like geometry and two ends with an elbow bend located along the length thereof in a desired location, a retaining section around the periphery of and near one end of said first visor arm piece for connecting the visor arm structure to a sun visor assembly mounting bracket, a pivot joint fitting having pivot pin bore therein at the opposite end of said first visor arm piece, and an electrical conducting assembly comprising;
      a pair of electrically conductive members positioned in spaced relationship by
      a plurality of spacing members, and
      a plurality rotational engagement detents;
   a second arm piece having a substantially straight rod-like geometry and two ends having located at one end a pivot joint fitting having pivot pin bore engagingly complimentary to the pivot joint fitting of said first visor arm piece, and an electrical conducting assembly comprising;
      a pair of electrically conductive members positioned in spaced relationship by
      a plurality of spacing members, and
      a plurality rotational engagement detents;

a pivot pin joining said complimentary joint fittings together through said bores of said first and said second arm pieces providing a moveable connection around the pivot pin;

thereby allowing the visor arm structure to provide power for a vanity mirror for example, and to bend the sun visor assembly out of the way of the deploying side air curtain.

16. The jointed two-piece visor arm structure as claimed in claim 15 wherein, said structure comprises a material selected from the group consisting essentially of acrylonitrile butadiene styrene (ABS), nylon, glass filled nylon, polypropylene, acetal, preferably glass filled nylon, and most preferably 33% glass filled nylon.

17. The jointed two-piece visor arm structure as claimed in claim 15 wherein, said first and said second arm pieces are comprised of the same material.

18. The jointed two-piece visor arm structure as claimed in claim 15 wherein, said pivot pin comprises steel.

19. The jointed two-piece visor arm structure as claimed in claim 15 wherein, said mating faces of the complimentary joint fittings have located thereon mating lugs and slots.

20. The jointed two piece visor arm structure as claimed in claim 15 wherein, the mating faces of the complimentary joint fittings have located thereon saw-tooth like surfaces.

* * * * *